UNITED STATES PATENT OFFICE.

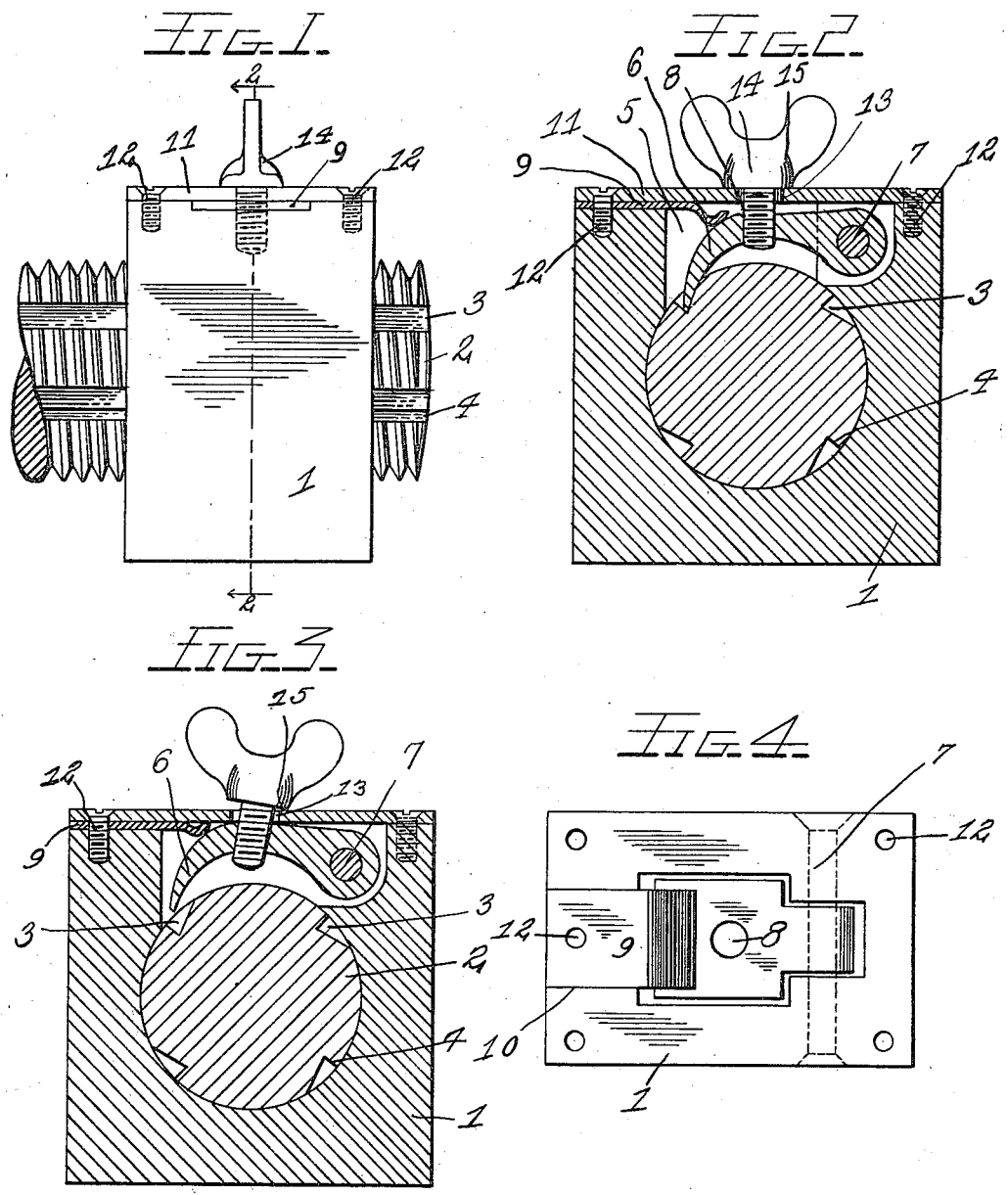

MIKE SCHOTSCH, OF YOUNGSTOWN, OHIO.

NUT-LOCK.

1,075,226.  Specification of Letters Patent.  Patented Oct. 7, 1913.

Application filed March 10, 1913. Serial No. 753,342.

*To all whom it may concern:*

Be it known that I, MIKE SCHOTSCH, a citizen of the United States, residing at Youngstown, in the county of Mahoning and State of Ohio, have invented certain new and useful Improvements in Nut-Locks; and I do declare the following to be a full, clear, and exact description of the invention, such as will enable others skilled in the art to which it appertains to make and use the same.

This invention relates to improvements in nut-locks.

One object of the invention is to provide a nut-lock adapted to automatically lock a nut in the position to which it has been adjusted on the bolt and having means whereby the locking mechanism may be released and held out of operation, said means being removable thereby preventing the releasing of the locking mechanism and removal of the nut by an unauthorized person.

Another object is to provide a nut-lock which will be simple, strong, durable and inexpensive in construction, efficient and reliable in operation and in which the locking mechanism is entirely inclosed and protected from the weather when the bolt is used in exposed places.

With these and other objects in view, the invention consists of certain novel features of construction, and the combination and arrangement of parts as will be more fully described and claimed.

In the accompanying drawings; Figure 1 is a side view of a nut and end of a bolt having my improved locking mechanism applied thereto; Fig. 2 is a cross sectional view thereof taken on the line 2—2 of Fig. 1 and showing the locking mechanism in operative position; Fig. 3 is a similar view showing the locking mechanism in an inoperative position and illustrating the means for releasing and holding the locking mechanism in a released position; Fig. 4 is a side view of the nut and the locking mechanism thereof with the cover plate of the locking mechanism removed.

Referring more particularly to the drawings, 1 denotes the nut and 2 denotes the bolt to which my improved locking mechanism is applied. In the bolt 2 are formed a series of longitudinally disposed grooves 3 of which there may be any desired number and which may be arranged at the desired distances apart around the bolt. The notches 3 are of suitable depth and have one wall thereof arranged radially to form a stop shoulder 4 while the other wall is beveled as shown. The grooves 3 extend substantially the entire length of the threaded portion of the bolt and are provided to receive the locking mechanism carried by the nut and which will be hereinafter described.

In one side of the nut 1 is formed a recess 5 the inner end of which opens through or into the bore of the nut to permit the surface of the bolt to engage or turn in the recess as clearly shown in Figs. 2 and 3 of the drawings. Arranged in the recess 5 is a locking pawl 6 which is pivotally mounted on a pivot pin 7 arranged transversely through the adjacent portion of the nut and having its ends riveted therein as shown. The free end of the pawl 6 curves downwardly and is adapted to be engaged with the grooves 3 in the bolt thereby locking the nut against unscrewing therefrom. In the pawl 6 substantially midway between its ends is formed a threaded aperture 8 the purpose of which will be hereinafter described. The pawl is held in yielding engagement with the bolt and with the grooves therein by a flat leaf spring 9 the outer end of which is secured in a transverse notch 10 formed in the adjacent side of the nut. The inner end of the spring is preferably turned upwardly to a slight extent and bears against the outer side of the pawl as shown. Arranged over the recess 5 in the side of the nut and over the notch 10 and spring 9 is a cover plate 11 which is fastened in position on the nut by short screws 12 one of which passes through the outer portion of the spring 9 and fastens the latter in position on the bolt. The plate 11 when thus arranged covers the pawl and spring and protects these parts from the weather when the bolt and nut are used in exposed places.

In the plate 11 and in line with the threaded aperture in the pawl 6 is a slot or elongated aperture 13 through which is inserted a pawl releasing screw 14 the inner end of which is adapted to be screwed into the threaded aperture 8 in the pawl and having on its outer end a winged head 15 which bears against the outer side of the plate 11 whereby when the screw is turned in the proper direction the pawl will be drawn outwardly against the pressure of the spring 9 and thereby disengaged from the grooves of the bolt 3 which will permit the nut to be unscrewed from the bolt. It will be understood that the screw is only employed for releasing the pawl to permit the nut to be unscrewed from the bolt and at all other times is removed from the pawl thereby preventing the releasing or tampering with the locking mechanism of the nut by unauthorized persons. As soon as the screw is removed from the pawl the spring 9 will immediately force the pawl down and hold the same in yielding operative engagement with the bolt which will prevent the latter from being unscrewed from the nut but which, owing to the beveled walls of the grooves 3 will not prevent the nut from being screwed inwardly or tightened up on the bolt.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:

In a nut-lock the combination with a nut having therein a recess opening into the bore of the nut and a notch communicating with said recess, and a bolt having therein longitudinal grooves; of a pawl pivoted in the recess of the nut and adapted to engage one of the grooves in the bolt, said pawl having therein a threaded passage, a spring secured in the notch of the nut and having its free end bearing on said pawl whereby the latter is held in operative engagement with the bolt, a protecting plate secured to the nut over the recess and pawl therein, said plate having a slot arranged in alinement with the threaded passage of the pawl, and a pawl operating screw adapted to be inserted through the slot in said plate and screwed into the threaded passage of the pawl whereby the screw is removably engaged with the pawl and provides a means for releasing and holding the pawl out of engagement with the bolt.

In testimony whereof I have hereunto set my hand in presence of two subscribing witnesses.

MIKE SCHOTSCH.

Witnesses:
HARRY E. JOHN,
D. ARTHUR WILLIAMS.

---

Copies of this patent may be obtained for five cents each, by addressing the "Commissioner of Patents, Washington, D. C."